(12) United States Patent
Keltner et al.

(10) Patent No.: US 11,650,046 B2
(45) Date of Patent: May 16, 2023

(54) METHOD AND SYSTEM FOR ASSEMBLING COMPONENTS TO STRUCTURES

(71) Applicant: Caterpillar Inc., Deerfield, IL (US)

(72) Inventors: Jeremiah Keltner, Galesburg, IL (US); Matthew Behmlander, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 935 days.

(21) Appl. No.: 16/527,863

(22) Filed: Jul. 31, 2019

(65) Prior Publication Data

US 2021/0033388 A1 Feb. 4, 2021

(51) Int. Cl.
*G01B 11/25* (2006.01)
*G01B 11/00* (2006.01)

(52) U.S. Cl.
CPC ........ *G01B 11/2518* (2013.01); *G01B 11/002* (2013.01)

(58) Field of Classification Search
CPC .......................... G01B 11/002; G01B 11/2518
USPC ....................................................... 700/245
See application file for complete search history.

(56) References Cited

U.S. PATENT DOCUMENTS

| | | |
|---|---|---|
| 5,663,795 A | 9/1997 | Rueb |
| 6,480,271 B1 | 11/2002 | Cloud et al. |
| 7,306,339 B2 | 12/2007 | Kaufman et al. |
| 9,410,793 B2 | 8/2016 | Kaufman et al. |
| 10,001,365 B2 | 6/2018 | Smith et al. |
| 19,052,734 | 8/2018 | Rueb |
| 2010/0302554 A1* | 12/2010 | Keshavmurthy .. G01B 11/2545 356/620 |
| 2017/0046865 A1* | 2/2017 | Cantwell .............. H04N 13/204 |

* cited by examiner

*Primary Examiner* — On S Mung
(74) *Attorney, Agent, or Firm* — von Briesen & Roper, s.c.

(57) ABSTRACT

A method for assembling a component to a structure includes determining, by a controller, a location on the structure for a placement of the component onto the structure. The method further includes activating, by the controller, a light source to project a visual indicator onto the location. The method also includes actuating, by the controller, a robotic implement to locate and position the component at the location based on the visual indicator projected onto the location.

20 Claims, 7 Drawing Sheets

METHOD AND SYSTEM FOR ASSEMBLING COMPONENTS TO STRUCTURES

TECHNICAL FIELD

The present disclosure relates to automated methods and systems for assembling components to structures. More particularly, the present disclosure relates to the use of a robotic implement to assemble one or more components to a structure.

BACKGROUND

In manufacturing environments, an assembling process involving the placement of a component to a structure (e.g., to a frame or to a chassis of a machine) must be performed properly to satisfy certain standard design and specification criteria. If such assembling processes are improperly performed, the end product may need to be scrapped or returned for re-work, incurring extra cost and time. As an example, improper assembling of a component to a structure may be caused by manual interventions in the assembling process—for manual interventions may increase the chances of error in the alignment of the component to the structure. Erroneous alignment and/or improper assembling of a component to a structure, if not detected prior to shipment or delivery of an associated end product, may also result in component or structural failures on the field, incurring warranty issues and customer ire.

U.S. Pat. No. 7,306,339 relates to a method for assembling parts onto an object in 3D space. The method includes projecting a glowing template on the object that guides the assembly of the parts or fabrication on the object.

SUMMARY OF THE INVENTION

In one aspect, the disclosure is directed towards a method for assembling a component to a structure. The method includes determining, by a controller, a location on the structure for a placement of the component onto the structure. The method further includes activating, by the controller, a light source to project a visual indicator onto the location. The method also includes actuating, by the controller, a robotic implement to locate and position the component at the location based on the visual indicator projected onto the location.

Certain aspects of the present disclosure relate to a system for assembling a component to a structure. The system includes a robotic implement and a controller operatively coupled to the robotic implement. The controller is configured to determine a location on the structure for a placement of the component onto the structure and activate a light source to project a visual indicator onto the location. Further, the controller is configured to actuate the robotic implement to locate and position the component at the location based on the visual indicator projected onto the location.

DETAILED DESCRIPTION

Figure 1:
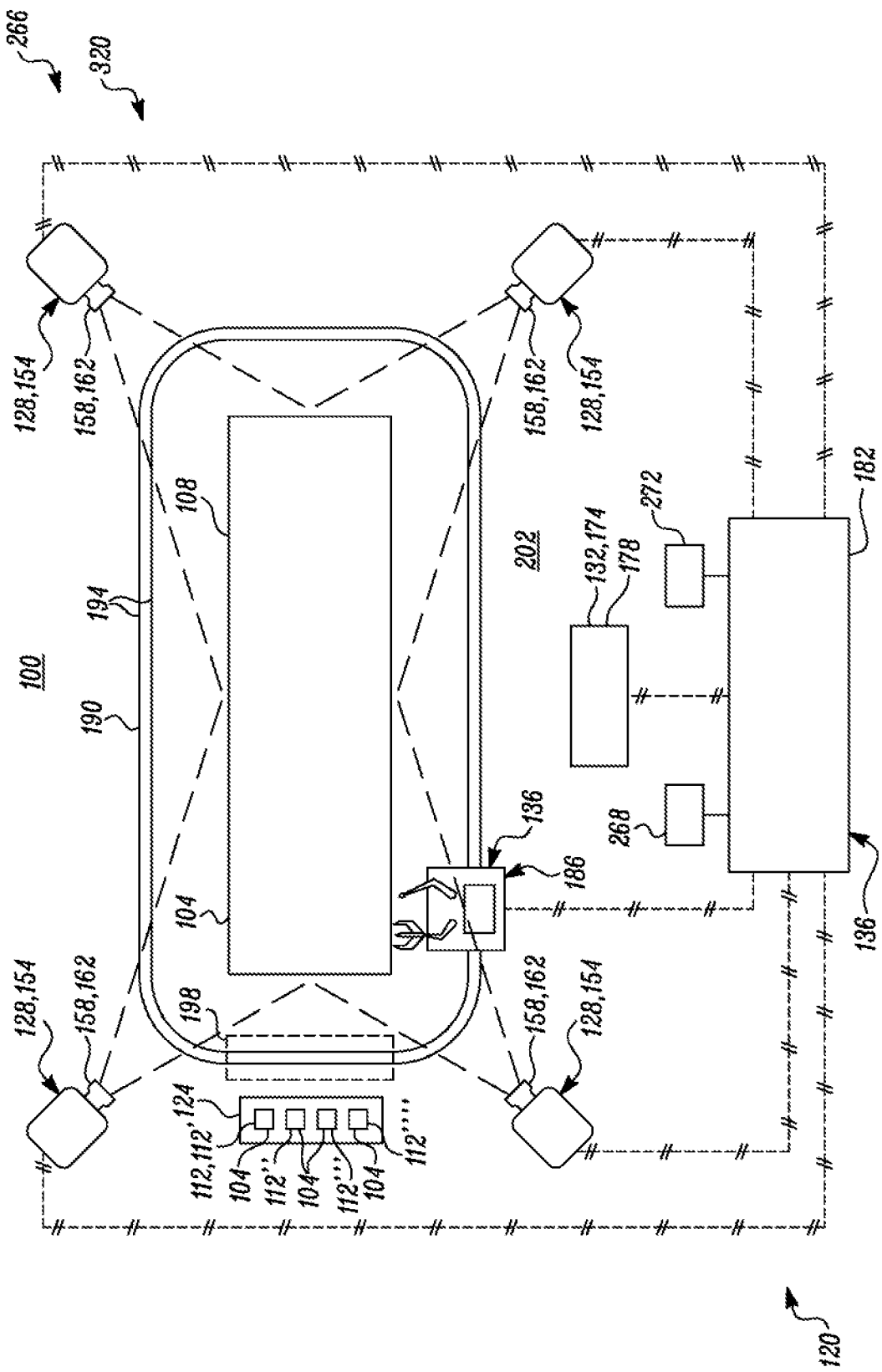
FIG. 1 is a manufacturing environment in which a component assembling unit, having a system, facilitates an automated assembly of a component to a structure, in accordance with an embodiment of the present disclosure.

Referring to FIG. 1, a manufacturing environment 100 is illustrated. The manufacturing environment 100 may include an assembly line where a number of parts 104 of a machine (not shown), or the like, may need to be assembled to each other so as to constitute and/or form (at least a part of) the machine. For discussing aspects of the present disclosure, said pats 104 are categorized into (and/or may include) a structure 108 and a number of components 112', 112", 112''', 112'''' out of which the structure 108 may define a base or a foundation onto which each of components 112', 112", 112''', 112'''' may be brought forth for an assembly to the structure 108. Although not limited, the structure 108 may represent a frame or a chassis of the machine, while the components 112', 112", 112''', 112'''' may represent/include one or more sub-frames, sub-systems, electronic/electrical units, brackets, columns, support structures, fluid hose units, linkages, wirings, arms, etc., that may be assembled to the frame or the chassis so as to constitute/form (at least a part of) the machine. For the most part of the forthcoming description, the disclosure may discuss assembling of the components 112', 112", 112''', 112'''' to the structure 108 by way of referencing one component (i.e., component 112') alone. Such discussions may be applicable for assembling all remaining components 112', 112", 112''', 112'''' to the structure 108. Wherever required, references to the other components 112", 112''', 112'''' or to all components 112', 112", 112''', 112'''' shall also be used. For ease, the component 12' may be referred to as component 112.

With continued reference to FIG. 1, a component assembling unit 120 is disclosed. The component assembling unit 120 includes a number of devices such as a component cell 124, a scanner 128, a light source 132, and a system 136. Each of the component cell 124, the scanner 128, and the light source 132, may be deployed around or in relative proximity to the structure 108, as shown, and may work in concert with the system 136, enabling the system 136 appropriately (and automatedly) place, position, and/or assemble the component 112, to the structure 108. In some embodiments, the component assembling unit 120 may include a template or a fixture (not shown) for stationing and/or positioning the structure 108 therein. Detailed discussions related to the component assembling unit 120 will now follow.

Figure 2:
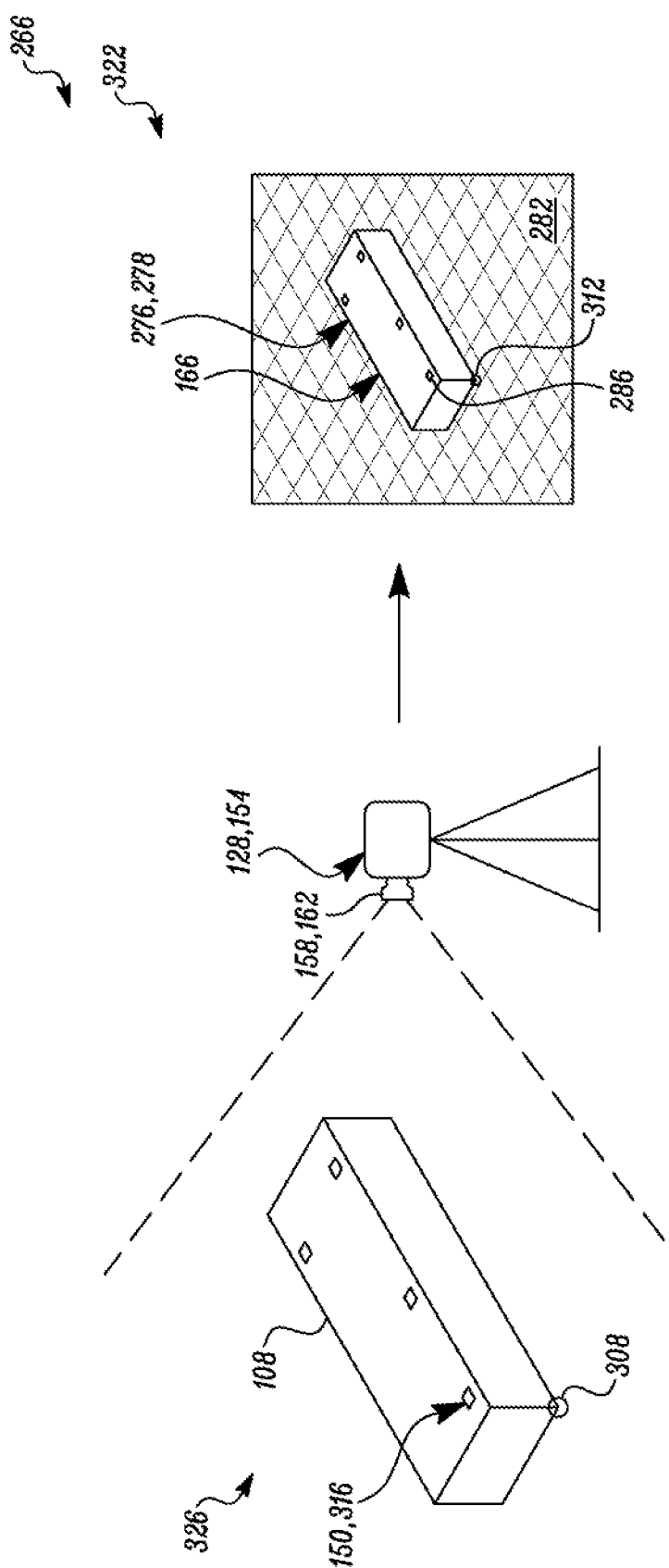
FIGS. 2 to 3 illustrate an exemplary scheme for determining a location on the structure for an assembly of the component to the location on the structure, in accordance with an embodiment of the present disclosure.

The component cell 124 may include a tray, a basket, or the like, that may be configured to receive and store the components 112', 112", 112''', 112''''. As one example, the components 112', 112", 12', 112'''' may be brought forth from an inventory (manually or by automated means) and may be arranged in the component cell 124, from where the component 112' may be selected among the many components (i.e., from among all components 112', 112", 112''', 112'''') for its corresponding placement at its corresponding location on the structure 108. According to one or more embodiments, components 112', 112", 112''', 112'''' arranged in the component cell 124 may correspondingly include unique codes (e.g., unique bar codes) that may differentiate one component from the other, and which may in turn help (the system 136 or a robotic implement 186 of the system 136) identify the component 112 among the many components 112', 112", 112'", 112"" for assembly to a specific or a corresponding location (e.g., location 150, see FIGS. 2, 4, and 5) on the structure 108. In yet some embodiments, the component cell 124 may also include a component cell code that may help (the system 136 or the robotic implement 186) identify the component cell 124 among several component cells, for instance, that may be positioned around the structure 108.

Figure 3:
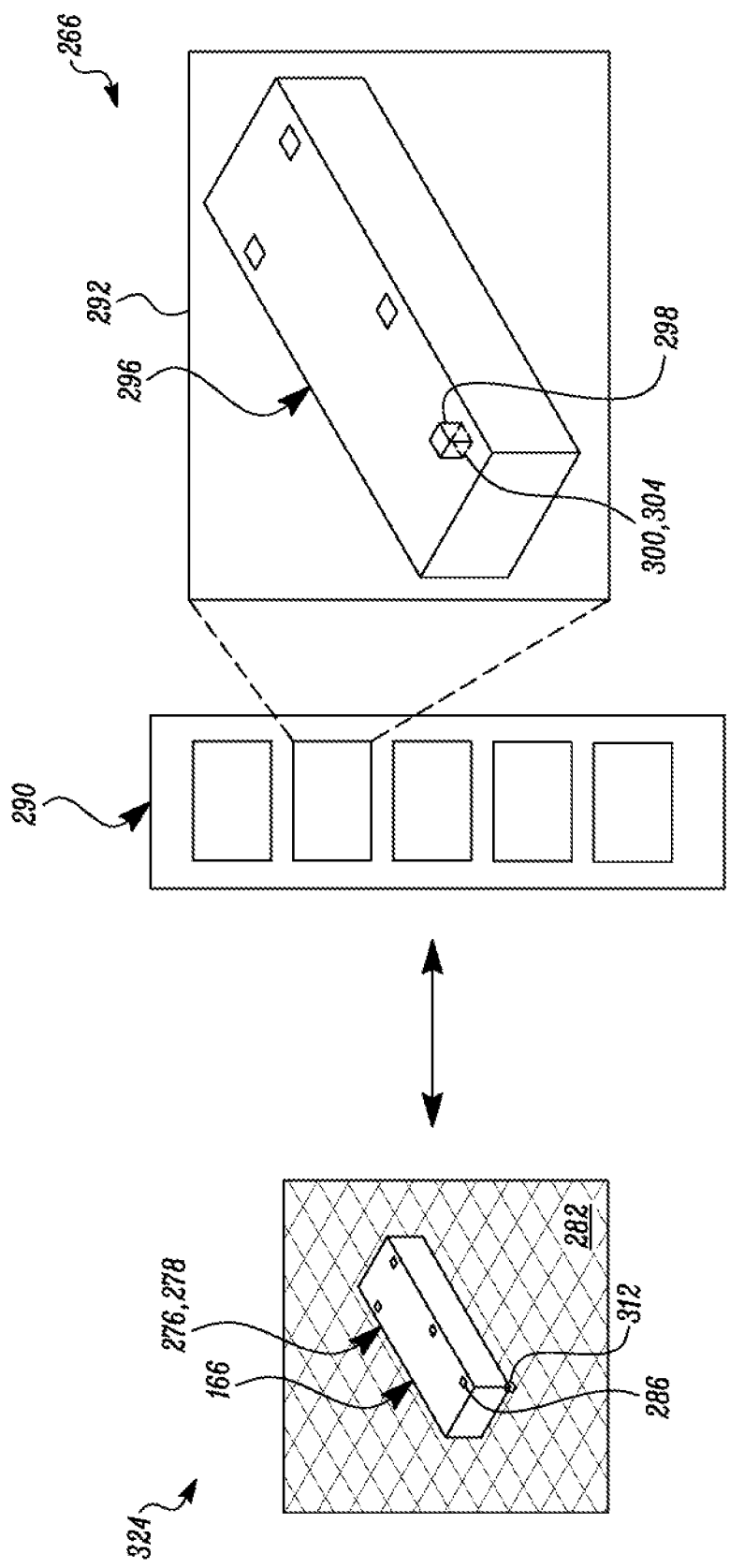

The scanner 128 may be adapted to scan the structure 108, and, thus, may include a 3-dimensional (3D) object scanner 154. The scanner 128 may include one or more scanning units 158, some or all of which may in turn include a laser scanner 162. The scanning units 158 may be deployed at different positions around the fixture (or the structure 108, as shown). In that manner, a scan of the structure 108 may be obtained from different angles and viewpoints. According to some embodiments, the scanning units 158 may be positioned so as to cover the sides (e.g., laterally opposed sides) of the structure 108, as is exemplarily shown in the layout or plan of the manufacturing environment 100 provided in FIGS. 1, 4, 5, and 6. Additionally, or optionally, one or more of the scanning units 158, or other similar scanning units, may be positioned above or below the structure 108 as well, so as to scan the upper and lower portions (and related surfaces) of the structure 108. In one embodiment, the scanner 128 (or the scanning units 158 of the scanner 128) may be adapted to generate a 3D point cloud data 166 (see FIGS. 2 and 3) of the structure 108.

According to an exemplary working scheme, the scanning units 158 of the scanner 128 may emit corresponding beams (e.g., laser beams) and may move the laser beams at a relatively high speed. Devices, such as an oscillating reflector or mirror, etc., (not shown) installed within the scanning units 158, may help move the corresponding laser beams up and down/left and right. As a result, the beams may sweep over and across the structure 108 and the same may be reflected back. As the beams return, the scanner 128 may note one or more positions based on the time it takes for each beam to bounce back from the structure 108. As the beams move at constant speed, the scanner 128 may compute the distance between the scanner 128 and structure 108. A systematic emission of numerous beams (e.g., laser beams) towards the structure 108 may allow the scanning units 158 (i.e., the scanner 128) to collate accurate measurement of distances to the structure 108, helping the scanner 128 generate the 3D point cloud data 166 of the structure 108. Other working schemes to generate the 3D point cloud data 166 may be contemplated.

The light source 132 may be configured to project a visual indicator 170 (see FIG. 4) at the location 150, indicating or highlighting the location 150 on the structure 108 where the component 112 may be placed for an assembly to the structure 108. The location 150 is determined on the structure 108 by the use of the 3D point cloud data 166, as generated by the scanner 128. However, further details related to the determination of the location 150 shall be discussed later in the disclosure.

The visual indicator 170, as projected by the light source 132, may include or define one or more attributes. For example, the attributes of the visual indicator 170 may correspond to one or more of a text (e.g., a numeric or an alphanumeric text/code associated with the component 112) projected at the location 150, a picture (e.g., of the component 112) projected at the location 150, a size, a shape, or a color, of any type of visual indicator 170, as projected at the location 150, etc. Such a visual indicator (i.e., the visual indicator 170), when projected on the location 150, may be detected by a detector (discussed later) of the system 136, and may assist with the placement and/or assembly of the component 112 at the location 150.

Additionally, or optionally, the visual indicator 170, as projected by the light source 132 onto the location 150, may define an outline of a portion of the component 112 that may come into an interfacial contact with the structure 108, as the component 112 may be placed at the location 150 of the structure 108 for any assembly to the structure 108. Such a feature may help the component 112 to be appropriately aligned to the location 150 on the structure 108 for a proper assemblage to the structure 108.

Although a single light source (i.e., the light source 132) is shown, additional light sources may be positioned around the structure 108. Alternatively, the light source 132 may in turn include multiple light source units arranged therein, each of which may be configured to project visual indicators (e.g., visual indicator 170) onto one or more locations on the structure 108 where the components 112', 112", 112'", 112"" may need to be assembled. Only one visual indicator 170 and only one location 150 is annotated for ease in understanding.

In one example, the light source 132 includes a laser source 174 and the light emitted by the light source 132 may include a laser beam—therefore, in some cases, the light source may be (or may include) a laser projector 178. Accordingly, the visual indicator 170 may be projected onto the location 150 by way of a laser beam from the laser projector 178 or the laser source 174. Given that multiple components (e.g., the components 112', 112", 12'", 112"") may need to be placed onto the structure 108, the light source 132 may include several laser sources (e.g., laser source 174) that may emit several corresponding laser beams to corresponding locations on the structure 108. According to one example, one laser beam may project one visual indicator 170 at one location 150 for the placement of one component (e.g., component 112) to that location 150. Understandably, therefore, several laser beams may project corresponding visual indicators at corresponding locations for the placement and assembly of corresponding components at those corresponding locations. In other words, the visual indicator 170 may relate and/or correspond to one specific component (e.g., component 112) from the many components 112', 112", 112'", 112"" arranged in the component cell 124.

The system 136 facilitates automated assembly of the component 112 to the location 150 on the structure 108 based on an input from the scanner 128 and by use of the light source 132 (i.e., by use of the visual indicator 170 projected by the light source 132). The system 136 includes one or more devices, such as a controller 182, a robotic implement 186, and a track 190, discussion related to each of which will now follow.

The track 190 may be disposed around the structure 108 to facilitate travel of the robotic implement 186 around the structure 108. The track 190 may include and/or be developed by arranging rails 194 (e.g., a pair of parallel rails) that may run (e.g., continuously or endlessly) around the structure 108. A number of the rails 194 may be higher or lower. For example, the track 190 may be also developed as a single monorail structure. The track 190 may be modular and may be easily disassembled and be re-arranged around several different structures (such as structure 108) possessing different shapes and sizes. At one portion 198 of the track 190, as shown, the track 190 may come in 'close proximity' to the component cell 124 in comparison to the other (or remainder) portions of the track 190.

In some embodiments, the track 190 may be cast as a projection on a ground 202 and may be disposed in the immediate vicinity of the structure 108, defining a virtual path around the structure 108 for facilitating a travel of the robotic implement 186 around the structure 108. In such a case, the track 190 may be devoid of the rails 194. As an example, a light source (e.g., a laser based light source) (not shown) may generate and project an illuminated path around the structure 108, and the robotic implement 186 may be guided along such an illuminated path for its travel around the structure 108. In such a case, the robotic implement 186 may include one or more illumination transducers (not shown) that may help detect the projected illumination (i.e., the illuminated path) and may instruct the controller 182 to facilitate the navigation of the robotic implement 186 along the path. The need for such an illuminated path may be considered, for example, when different structures (i.e., different in terms of shape and size) need to be assembled in quick succession, and correspondingly different tracks (or paths for the travel of the robotic implement 186) need to be disposed around such different structures.

Referring to FIGS. 1, 4, 5, 6, and 7, the robotic implement 186 may be configured to move/travel over and along the track 190 to reach up to the component 112 and pick the component 112 (i.e., to locate the component 112) from the component cell 124. The robotic implement 186 may move/travel over and along the track 190 to place (i.e., to position) (and optionally assemble) the component 112 at the location 150 on the structure 108. To this end, the robotic implement 186 may include a body 206 and a component selector tool 210.

Figure 7:
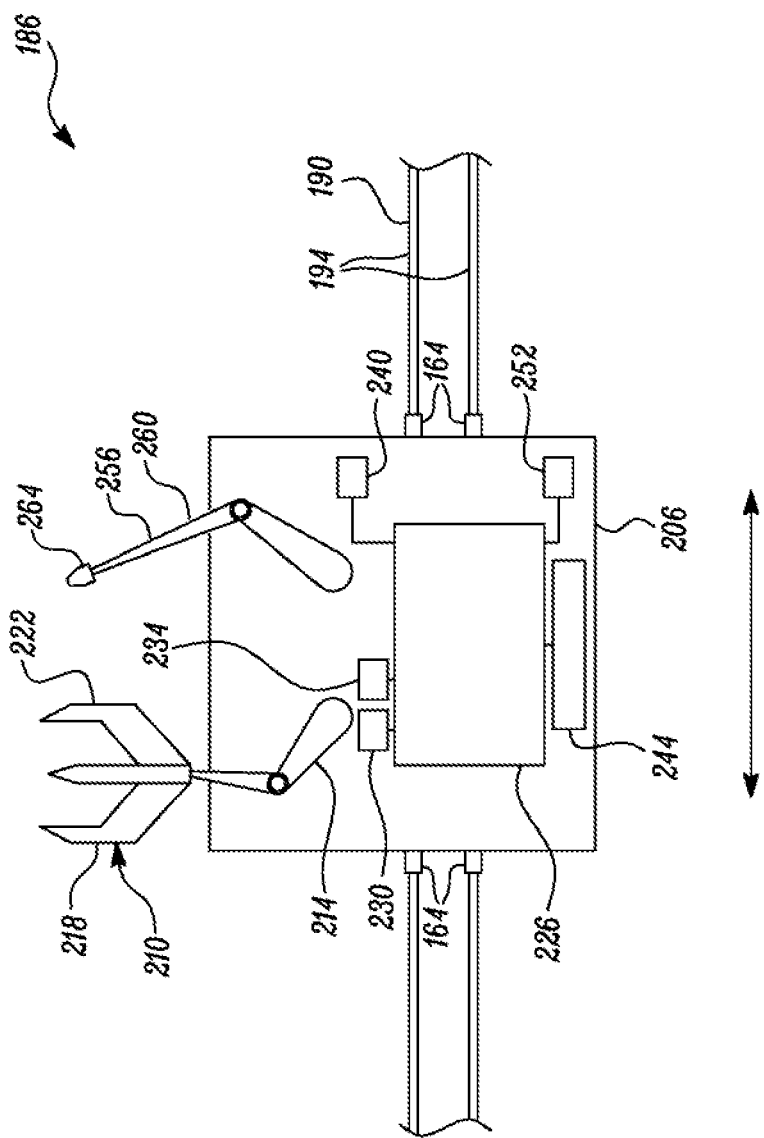
FIG. 7 is a robotic implement of the system, in accordance with an embodiment of the present disclosure.

Referring to FIG. 7, the component selector tool 210 may be coupled to the body 206 and may be free to move around and along multiple degrees of freedom relative to the body 206. According to one implementation, the component selector tool 210 may include an arm assembly 214 (e.g., comprised of one or more pivotably coupled arms) pivotably coupled to the body 206 at one end, while also being pivotably coupled to an end-effector 218 at another end. The end-effector 218 may include jaws 222 that may collectively expand and retract to selectively grab and release the component 112. For example, the component selector tool 210 may be configured to grab the component 112 from among the many components 112', 112", 112'", 112"" disposed in the component cell 124 and release the component 112 at the location 150 once the component 112 is placed (appropriately) by the end-effector 218 at the location 150.

The body 206 may also include one or more traction devices 164 that may be slidable (or movably) engaged with the track 190, so as to help move the body 206 (and the robotic implement 186) over and along the track 190. The traction devices 164 may include wheels that may roll and move over the rails 194 of the track 190, although it is possible for the traction devices 164 to include other devices and mechanisms, such as those that facilitate a movement of the body 206 relative to the track 190 by way of magnetic levitation. In the case where the track 190 is defined by the illuminated path, the traction devices 164 may include wheels that may simply roll and move over the ground 202 on which the structure 108 is positioned, with such movement being guided along the illuminated path.

Further, the robotic implement 186 may include a control unit 226, a first actuator 230, and a second actuator 234. Each of the first actuator 230 and the second actuator 234 may include an electric motor, although other actuator types may be contemplated. The first actuator 230 may facilitate the movement of the arm assembly 214 along the many degrees of freedom, while the second actuator 234 may facilitate an expansion and the retraction of the jaws 222. The control unit 226, the first actuator 230, and the second actuator 234, may be arranged within the body 206 of the robotic implement 186.

The control unit 226 may control the functioning of the first actuator 230 and the second actuator 234 to control parameters, such as speed, torque, activation, deactivation, etc., of the arm assembly 214 and the jaws 222. The control unit 226 may also control a functioning of the traction devices 164. For example, the control unit 226 may be operatively coupled to traction motors of the traction devices 164 and may dynamically determine and set a speed and/or direction of travel of the traction motors so that the traction devices 164 (and the robotic implement 186) may move relative to the track 190 (see direction, A and B, FIGS. 5 and 6). Although not limited, it is possible for the control unit 226 to facilitate a movement of the traction devices 164 (and the robotic implement 186) in one direction alone.

The robotic implement 186 may further include a vision detector (or simply a detector 240), and a component scanner 244. The detector 240 may be able to detect the visual indicator 170 (and/or the corresponding beam 248) projected at the location 150 on the structure 108 by the light source 132 (see FIG. 4). The detector 240 may include one or more light sensitive sensors (such as photoelectric sensors, photo-emissive cells, photo-conductive cells, light dependent resistors, and the like) that may convert a detected light beam or laser beam (e.g., beam 248) into electrical signals (usable for digital processing and analysis by the controller 182). In some scenarios, the light sensitive sensors may be able to detect only specific light forms, such as ones that are coherent and focused (as may be characteristic of laser beams).

In some embodiments, the detector 240 may detect the point of start of the beam 248 (i.e., at the light source 132), track a path defined by the beam 248, and detect the end (i.e., at the visual indicator 170) of the beam 248 or a locale 150' from which the beam 248 may bounce and may return to the light source 132. Having tracked the beam 248, the detector 240 may be configured to also relay data corresponding to the locale 150' of the visual indicator 170 to the controller 182, so as to confirm if the locale 150' is one and the same as the location 150—the location 150 may be determined by the controller 182, and, as stated above, details related to the determination of the location 150 (by the controller 182) will be discussed later in the disclosure.

In one example, the detector 240 may include one or more image capturing devices (not shown) with high-resolution optics that may be configured to capture an image of the visual indicator 170 projected at the location 150 from one or more angles. Such an image (or data related to such an image) may be shared with the controller 182 for analysis. In yet some examples, the detector 240 may be disposed outside the robotic implement 186. In still some embodiments, the detector 240 may scan for the visual indicators (e.g., visual indicator 170) according to a predefined view range defined by an area over and around the structure 108.

Based on the data, the image, or the attribute of the visual indicator 170, the component scanner 244 may be configured to receive a signal from the controller 182 indicating the component (i.e., the component 112) that is to be selected from the component cell 124. As an example, since the component 112 may be one among the many components 112', 112", 112'", 12"" of the component cell 124, the component scanner 244 may help distinguish and identify said component 112 from the many components 112', 112", 112''', 112'''' of the component cell 124 by scanning the unique code (e.g., a unique bar code) associated with the component 112. To this end, the component scanner 244 may include an RFID (Radio Frequency Identification Device) based scanner that may scan such unique codes, although other scanner types are possible.

To facilitate a selection and a pick-up of the component 112 from the component cell 124, it will be understood that the robotic implement 186 (or the component selector tool 210 of the robotic implement 186) needs to be relatively close to the component cell 124 such that the arm assembly 214 of the component selector tool 210 may extend and grab the relevant component (e.g., component 112) from the component cell 124. A minimum closeness of the robotic implement 186 to the component cell 124 required in such a state may be referred to as 'close proximity' of the robotic implement 186 to the component cell 124. The forthcoming description will include discussions related to some exemplary methods by which the 'close proximity' of the robotic implement 186 relative to the component cell 124 may be determined. Such methods, however, need not be seen as limiting the aspects of the present disclosure in any way.

According to one embodiment, the robotic implement 186 may include a cell scanner 252. The cell scanner 252 may be configured to scan and detect the component cell code associated with the component cell 124 and may facilitate the determination of the proximity of the robotic implement 186 to the component cell 124. As one example, the cell scanner 252 includes an RFID (Radio Frequency Identification Device) based scanner that may be configured to scan and detect the component cell code within a limited or predefined field of view. If, at any given point, the cell scanner 252 detects that the component cell 124 (or the component cell code) falls within the predefined field of view, the controller 182 may determine that the robotic implement 186 is in 'close proximity' to the component cell 124. Alternatively, if, at any given point, the cell scanner 252 detects that the component cell 124 (or the component cell code) falls outside of the predefined field of view, the controller 182 may determine that the robotic implement 186 is 'away' or 'far away' from the component cell 124.

Additionally, or optionally, whenever the robotic implement 186 moves over the portion 198 of the track 190 (e.g., in the case of a physical track), or is stationed over the portion 198 of the track 190, said 'close proximity' of robotic implement 186 to the component cell 124 may be ascertained and determined. As an example, the portion 198 of the track 190 may include weight sensors or pressure sensors, and, accordingly, a movement or a stationing of the robotic implement 186 over the portion 198 may signal the presence of the robotic implement 186 in 'close proximity' to the component cell 124.

According to an exemplary embodiment, the body 206 may also include a work implement 256 to secure the component 112 to the structure 108 at the location 150. Such a work implement 256 may include an arm assembly 260 (comprised of one or more arms) (similar to the arm assembly 214 of the component selector tool 210), with one end of the arm assembly 260 being pivotably coupled to the body 206, while another end of the arm assembly 260 being coupled to a work tool 264 that may be used to perform operations related to the assembly of the component 112 to the location 150.

In some embodiments, the work tool 264 may be configured to perform welding operations to fasten and secure the component 112 to the structure 108 at the location 150. To this end, the work tool 264 may include a welding electrode and/or a torch that may facilitate the welding of the component 112 to the structure 108 at the location 150. For operating such a tool an electric power supply may be provided to the work tool 264 (or to the welding electrode of the work tool 264) from a suitable power source. In some cases, the detector 240 may be configured to detect a progress of an associated welding process and may be in communication with the controller 182 and may transmit data (e.g., images) pertaining to the various welding stages of such a welding process to the controller 182. The controller 182 may, in turn, monitor and track the welding process (e.g., by analyzing a seam or an interface of the weld, as developed by way of the welding process). Alternatively, the work tool 264 may include other types of fastening units as well, such as automated threaded fastening units (with automated air guns, and the like) that may help secure (e.g., removably) the component 112 to the structure 108 at the location 150.

Referring back to FIGS. 1, 4, 5, and 6, the controller 182 may be configured to retrieve a set of instructions from a memory 268 and run the set of instructions to facilitate the operations of the scanner 128, the light source 132, and the robotic implement 186 (and the devices associated with the robotic implement 186) to facilitate the assembly of the component 112 at the location 150. A method for assembling the component 112 to the structure 108 (i.e., to the location 150 of the structure 108) may be referred to as an 'assembly process 266'.

To this end, the controller 182 may be communicably coupled (e.g., wirelessly) to the scanner 128, the light source 132, and the robotic implement 186, and may be configured to receive input (e.g., from an operator) based on which the controller 182 may initiate and run one or more of the aforesaid sets of instructions, to execute and accomplish the assembly process 266. The controller 182 may include or be coupled to a human-machine interface 272 (e.g., a touch-screen-based control panel) that may receive such input from one or more operators and may transmit such input to the controller 182, 112', 112", 112''', 112''''. Such a human-machine interface 272, in some cases, may belong to (or be pan of) any available/existing human-machine interface in the manufacturing environment 100. Alternatively, the human-machine interface 272 may belong to (or be part of) the system 136.

While many functionalities of the controller 182 and the control unit 226 have been discussed in the present disclosure, it may be contemplated that the controller 182 and the control unit 226 may form one single integrated entity in some cases. Such an integrated entity may be housed within the robotic implement 186, or elsewhere. Alternatively, the controller 182 may be split as multiple control sub-systems with each sub-system being integrated into multiple devices (i.e., the scanner 128, the light source 132, and the robotic implement 186) of the component assembling unit 120 (or into other nearby systems available in the manufacturing environment 100), and with each sub-system being communicatively coupled (e.g., wirelessly) to the other so as to the perform the many functions of the controller 182, as discussed herein. The controller 182 may also be configured as a stand-alone entity. Regardless of the controller 182's configuration and/or integration into one or more of the aforesaid devices, a transmission of data, as flowing from one device (i.e., the scanner 128, the light source 132, and the robotic implement 186) of the component assembling unit 120 to another device, may be set out and performed in a closed loop manner.

The controller 182 may include a microprocessor-based device, and/or may be envisioned as an application-specific integrated circuit, or other logic devices, which provide controller functionality, and such devices being known to those with ordinary skill in the art. The controller 182 may be implemented using one or more controller technologies, such as Reduced Instruction Set Computing (RISC) technology. Complex Instruction Set Computing (CISC) technology, etc. Further, the controller 182 may also be coupled to and work in conjunction with one or more memory units, such as the memory 268.

Processing units within the controller 182 may include processors, examples of which may include, but are not limited to, an ×86 processor, a Reduced Instruction Set Computing (RISC) processor, an Application Specific Integrated Circuit (ASIC) processor, a Complex Instruction Set Computing (CISC) processor, an Advanced RISC Machine (ARM) processor or any other processor.

Examples of the memory 268 may include a hard disk drive (HDD), and a secure digital (SD) card. Further, the memory 268 may include non-volatile/volatile memory units such as a random-access memory (RAM)/a read-only memory (ROM), which include associated input and output buses. The memory 268 may be configured to store one or more sets of instruction that may be executable by the controller 182 to execute the assembly process 266.

INDUSTRIAL APPLICABILITY

The assembly process 266 may include various exemplary stages or steps (e.g., steps 320, 322, 324, 326, 328, 330, and 332) as have been indicated and provided alongside the depictions of FIGS. 1 to 6. Details related to such steps of the assembly process 266 will now be discussed.

During the assembly process 266, the controller 182 may receive an input pertaining to a start of the assembly process 266. Such an input may be fed into the controller 182 by way of an operator accessing the human-machine interface 272. Accordingly, the controller 182 may activate the scanner 128. An activation of the scanner 128 may mean an activation of one or more of the scanning units 158 disposed within the scanner 128 that allows the scanner 128 to scan and generate the 3-dimensional (3D) point cloud data 166 of the structure 108. This corresponds to step 320 of the assembly process 266 (see FIG. 1).

Thereafter, the controller 182 may gather the 3D point cloud data 166 (as generated by the scanner 128) and may develop a model 276 of the structure 108. In one example, the model 276 includes a graphical 3D object 278 generated in 3D coordinate system space 282. This corresponds to step 322 of the assembly process 266, see FIGS. 2 and 3).

Once the model 276 of the structure 108 is developed, the controller 182 may identify one or more points 286 on the model 276 of the structure 108 to (correspondingly) determine the location 150 on the structure 108. According to an exemplary embodiment, identifying the points 286 on the model 276 includes comparing the model 276 to a predefined model 296 of the structure 108. This corresponds to step 324 of the assembly process 266 (see FIG. 3).

The controller 182, having developed the model 276 of the structure 108 (based on the gathered 3D point cloud data 166), may initiate identification of the model 276 by detecting one or more of a dimensional data, a specification data, a configurational data, a profile data, etc., associated with the model 276. The controller 182 may compare such data with data available and associated with several predefined models in a repository 290—the repository 290 may be a 'Part Library' stored within the memory 268 or within databases that may be accessed by the controller 182. Based on the comparison, the controller 182 may match the model 276 against at least one of the predefined models (i.e., the predefined model 296) and may retrieve that predefined model (i.e., predefined model 296) that is either closest or is an exact match to the model 276. A part number associated with the predefined model 296 may be then determined by the controller 182, and, it may be accordingly established that the model 276 (and thus the structure 108) represents or is one and the same as the predefined model 296 having the determined part number.

In one example, the predefined model 296 may be retrieved from an assembly file 292 (see FIG. 3) of the repository 290. Such an assembly file 292 may include several predefined models (including the predefined model 296) participating together to constitute and/or form (at least a part of) a larger assembly model of the machine. Optionally, the predefined model 296 may be stored in the repository 290 as an independent part file and may be accordingly retrieved from such an independent part file, when required.

In some cases, the operator may have the knowledge with regard to (or may have the ability to determine) the part number associated with the structure 108. Accordingly, it is possible that, in such cases, the operator may input the part number into the controller 182 at the start of the assembly process 266. Based on the entered part number, the controller 182 may generate (e.g., directly) the model 276 of the structure 108 without the need to have the 3D point cloud data 166 generated by the scanner 128. In such cases, therefore, the scanner 128 and the stage of determining the part number may be respectively omitted from the component assembling unit 120 and assembly process 266.

Having determined the part number, the controller 182 may be configured to retrieve data that corresponds to an assembly of the predefined model 296 with a model of the component 112. For example, the controller 182 may retrieve such data from the assembly file 292. The model of the component 112 may be referred to as a 'component model 298' (see FIG. 3). Based on such data, the controller 182 may analyze and determine a region (on the predefined model 296) where the component model 298 is interfaced and arranged with the predefined model 296, and, accordingly, may also determine a virtual footprint 300 (e.g., an amount of virtual space) occupied by the component model 298 on the predefined model 296. Upon such detection, the controller 182 may also detect the coordinates of the virtual footprint 300. The coordinates, as detected, may define a predetermined spot 304 on the predefined model 296.

Based on such detection, the controller 182 may compare the model 276 of the structure 108 to the predefined model 296 and may identify one or more points on the model 276 that correspond to the predetermined spot 304 on the predefined model 296—said one or more points are detected as the points 286. In other words, the controller 182 may determine the points 286 on the model 276 based on the predetermined spot 304 on the predefined model 296.

Based on changing design and specification requirements, a position of the component 112 relative to the structure 108 may change from one assembly process to another. Accordingly, the virtual footprint 300, as defined between the component model 298 and the predefined model 296, may need to be dynamically updated, as well. Therefore, the repository 290 from which the controller 182 may fetch and retrieve data corresponding to an assembly of the predefined model 296 with the component model 298 (e.g., the assembly file 292), may be a repository or database into which frequent changes and updates may be made.

Once the points 286 on the model 276 of the structure 108 are identified, the controller 182 may determine the location 150 on the structure 108 for a placement of the component 112 onto the structure 108 according to the points 286. This corresponds to step 326 of the assembly process 266 (see again FIG. 2).

To determine the location 150, the controller 182 may be configured to determine an orientation (i.e., a manner of stationing and deployment) of the structure 108. In one example, the orientation of the structure 108 may be set according to a fixed frame of reference, and which may be pre-fed and/or be known to the controller 182. In some cases, as the structure 108 may be stationed within a template, the template may help the controller 182 determine and/or fix a frame of reference for the structure 108 based on which a position and orientation of the model 276 may be corresponded in 3D coordinate system space 282. In that manner, features, such as points, corners, edges, contours, surfaces, etc., as found on the structure 108 (in reality or in the real world) may be matched and co-related with corresponding features on the model 276 in 3D coordinate system space 282.

Next, the controller 182 may determine a datum 308 on the structure 108. The datum 308 may correspond to a point on the structure 108 which may be predefined and prestored within the memory 268 and/or may be known to/computed by the controller 182 according to the fixed frame of reference. Once the datum 308 is defined or determined, the controller 182 may identify a point or reference, referred to as a fiducial 312, corresponding to the datum 308, on the model 276. Thereafter, the controller 182 may detect the coordinates of the points 286 on the model 276 relative to the fiducial 312. Once the coordinates of the points 286 are detected, the controller 182 may compute a relative or a corresponding site 316 (e.g., virtually) on the structure 108 that relates to the datum 308 as the coordinates of the points 286 relate to the fiducial 312. The site 316 (e.g., virtually), as computed by the controller 182, is determined as the location 150 on the structure 108. In that manner, the location 150 is determined corresponding to the points 286 on the model 276 of the structure 108.

Figure 4:
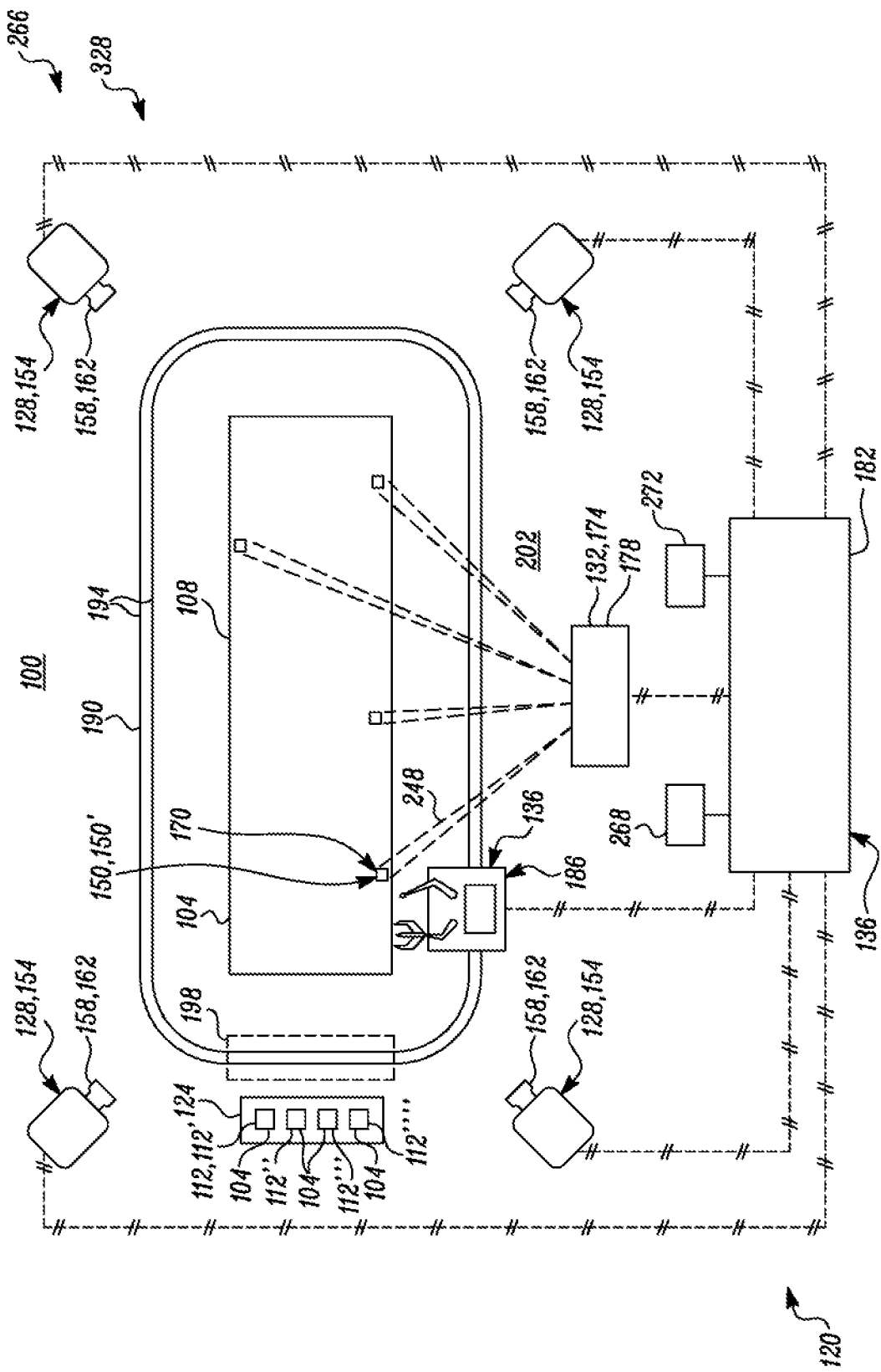
FIGS. 4 to 6 are exemplary stages or steps involved with the assembly of the component to the location on the structure, when viewed in conjunction with FIG. 1, in accordance with an embodiment of the present disclosure.
Figure 5:
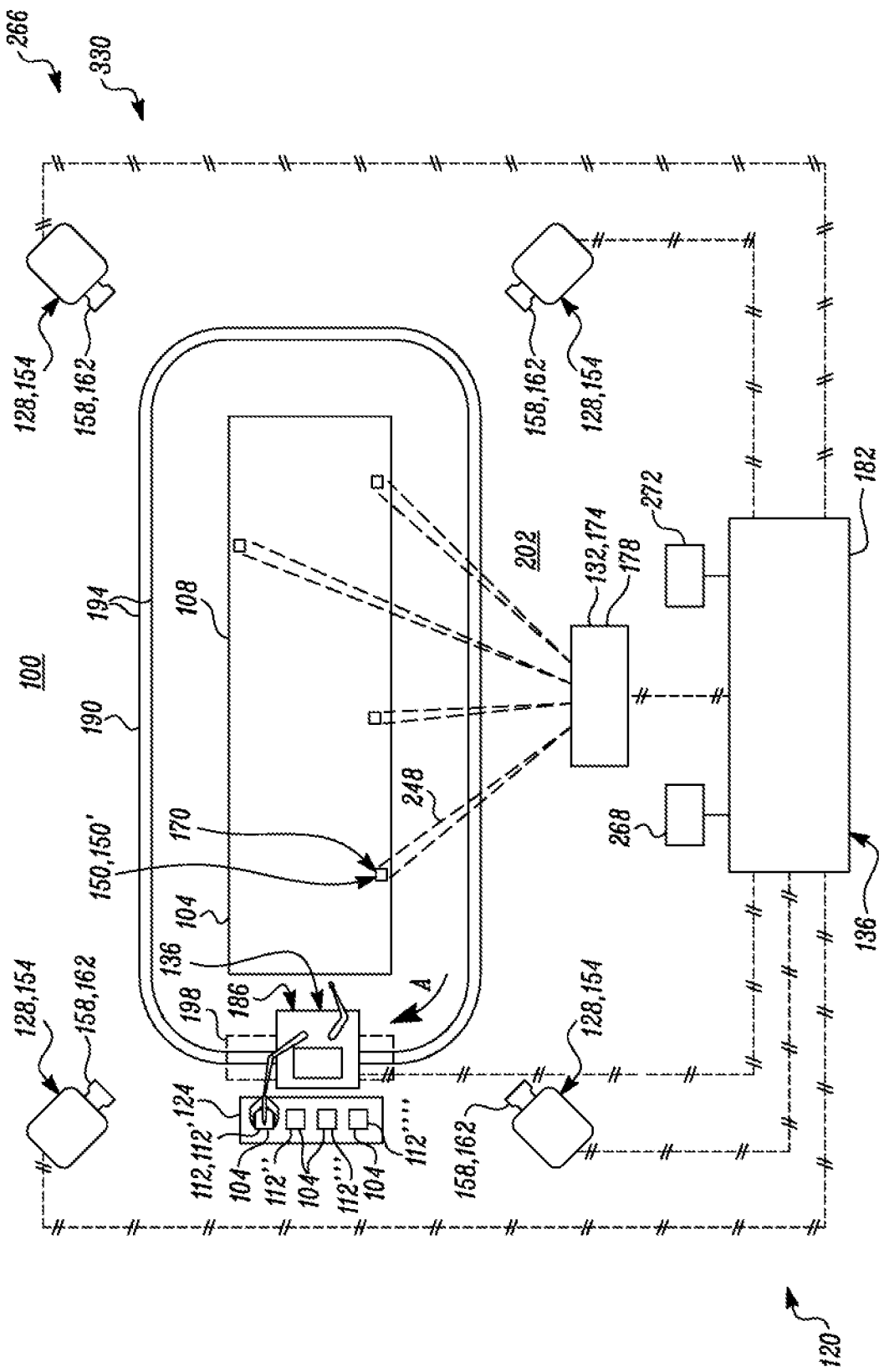

Referring to FIG. 4, based on the determined location 150, the controller 182 may activate the light source 132 such that the beam 248 emitted from the light source 132 may project the visual indicator 170 onto the location 150. In that manner, the location 150 is highlighted in reality or in the real world. It may be noted that activating the light source 132, in some cases, may include moving or articulating the light source 132, as well. This corresponds to step 328 of the assembly process 266 (see FIG. 4).

Upon an activation of the light source 132, and upon the projection of the visual indicator 170 at the location 150, the controller 182 may instruct the detector 240 to detect (at least one of) the attributes (e.g., color, shape, text as projected, etc.) of the visual indicator 170. In some cases, the controller 182 may instruct the control unit 226 to set the traction devices 164 in motion so as to enable the robotic implement 186 (and thus the detector 240) to move relative to (i.e., over and along) the track 190 and travel around the structure 108. In so doing, the detector 240 may detect/scan all around the structure 108 for the visual indicator 170 (and, exemplarily, for other similar visual indicators in the case where all the components 112', 112", 112''', 112'''' are to be assembled to the structure 108). Once the visual indicator 170 is detected by the detector 240, the detector 240 may be configured to pass data related to the visual indicator 170 (i.e., one or more attributes associated with the visual indicator 170) to the controller 182 (e.g., in a controller specific format).

Based on the attribute(s) of the visual indicator 170, the controller 182 may generate and transmit a signal to the component scanner 244 indicating the component (i.e., component 112) that is to be selected from the component cell 124. Simultaneously, or subsequently, the controller 182 may also instruct the robotic implement 186 (or the control unit 226 of the robotic implement 186) (see FIG. 7) to set the traction devices 164 in motion to move the robotic implement 186 (see direction. A, FIG. 5) along the track 190 to reach within 'close proximity' to the component cell 124. Once the robotic implement 186 is within 'close proximity' to the component cell 124, the controller 182 may instruct the control unit 226 to deactivate the traction devices 164, thereby allowing the robotic implement 186 to be stationed in 'close proximity' to the component cell 124. Thereafter, the controller 182 may instruct the component scanner 244 to scan the components 112', 112", 112''', 112'''' disposed within the component cell 124, and may match the signal (which may include a code) against the unique codes associated with each component 112', 112", 112''', 112'''' of the component cell 124, for component selection and pick-up.

Upon a match of the signal with a unique code associated with a component (i.e., component 112) in the component cell 124, the controller 182 may transmit a signal to the component selector tool 210 to actuate and expand the jaws 222 of the end-effector 218, extend the arms of the arm assembly 214, and grab the component 112 from among the many components 112', 112", 112''', 12'''' of the component cell 124. An ensuing engagement of the component 112 to the component selector tool 210 may be termed as a 'grabbed state'. In that manner, the controller 182 actuates the robotic implement 186 to locate and select the component 112 (by way of the component selector tool 210) from among the many components 112', 112", 112''', 112'''', with such selection being based on the attribute of the visual indicator 170 projected onto the location 150. This corresponds to step 330 of the assembly process 266 (see FIG. 5).

Upon locating and selecting the component 112, the controller 182 may instruct the detector 240 to detect an end (i.e., the visual indicator 170) of the beam 248 or the locale 150' from which the beam 248 may bounce and may return to the light source 132 and corresponding to which the component 112 may be placed on the structure 108. Having tracked the beam 248 from start to end, the detector 240 may be configured to relay data corresponding to the locale 150' (or the location 150) of the visual indicator 170 to the controller 182. In some cases, the controller 182 may compare the locale 150' to the location 150 of the visual indicator 170 so as to confirm if the locale 150', as detected by the detector 240, matches with (and/or is one and the same as) the location 150 to which the component 112 is to be assembled. In some embodiments, such comparison may be performed at the stage where the detector 240 may scan/detect the visual indicator 170 (or the attributes of the visual indicator 170) for component selection.

In the case of assembly of many components 112', 112", 112''', 112'''' to corresponding locations on the structure 108, the controller 182, having received data related to the locale 150' of the visual indicator 170 from the detector 240, may confirm that the locale 150' is one among the many locations to which a component is to be assembled to, and further may also determine which component (i.e., component 112) among the many components 112', 112", 112''', 112"" is to be assembled to the locale 150'.

Figure 6:
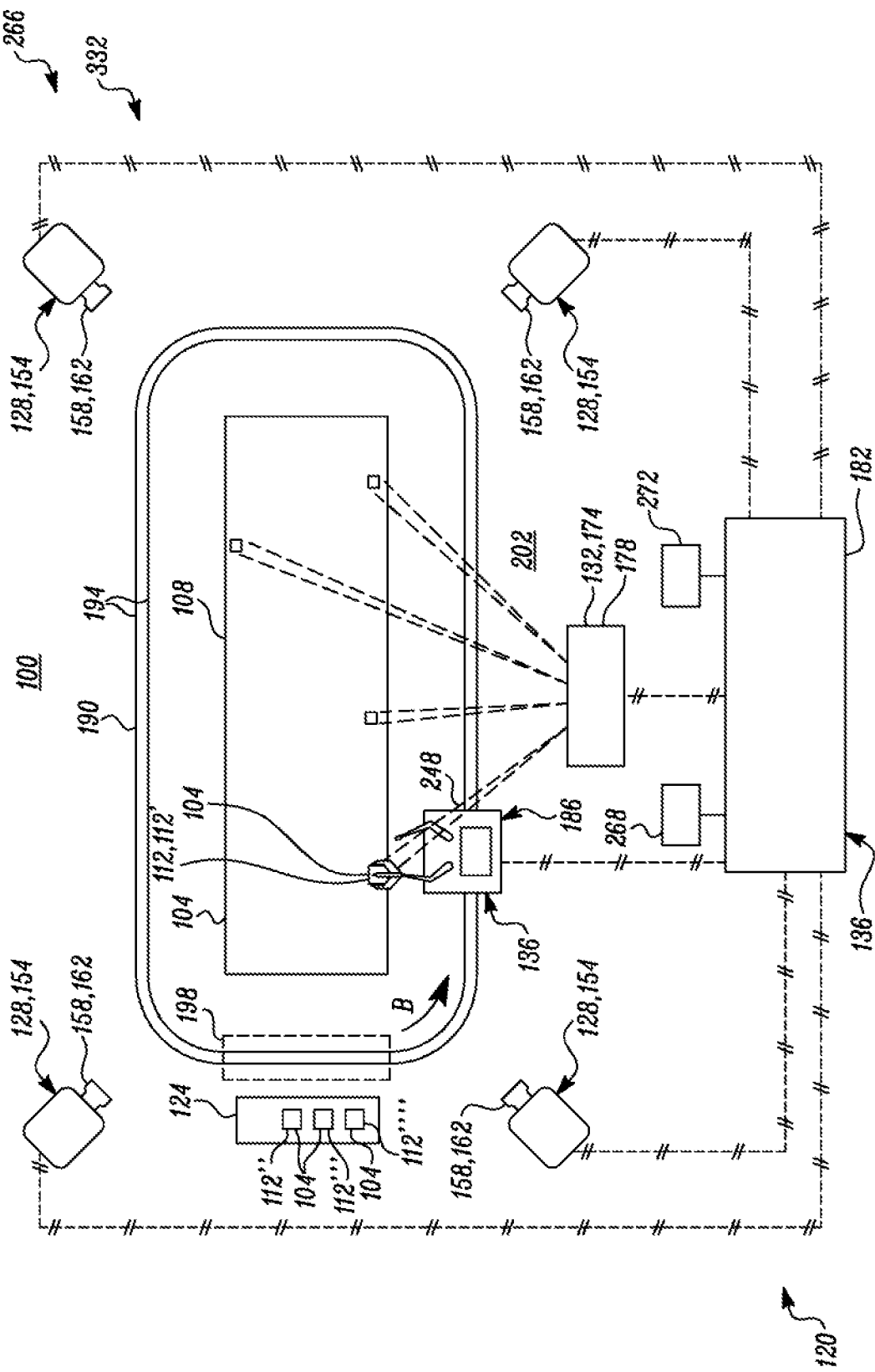

Based on data corresponding to the locale 150' of the visual indicator 170, the controller 182 may instruct the control unit 226 to move the traction devices 164 (and thus the robotic implement 186) in the direction of the locale 150' to reach the locale 150', so as to place the component 112 at the locale 150' (i.e., the location 150) (see direction, B, FIG. 6). During the movement of the traction devices 164 or the robotic implement 186, the component selector tool 210 may retain the component 112 in the 'grabbed state'. Once the robotic implement 186 reaches up to the locale 150' (or the location 150), the component selector tool 210 may release the selected component (i.e., the component 112) at the locale 150' (i.e., location 150) for placing the component 112 at the location 150. In that manner, the controller 182 actuates the robotic implement 186 to position the component 112 at the location 150 based on the visual indicator 170 projected onto the location 150. This corresponds to step 332 of the assembly process 266 (see FIG. 6).

According to an embodiment, once the robotic implement 186 reaches and places the component 112 at the locale 150' (i.e., the location 150), the vision system or the detector 240 (or another similar device) may be configured to capture an image of a 'placed state' of the component 112 at the location 150. Such an image may be supplied to the controller 182 to help the controller 182 compare and analyze the image with an image corresponding to an 'ideal placed state' of the component 112 to the location 150 on the structure 108. Such an image of the 'ideal placed state' may be predefined and/or be pre-stored within the memory 268 of the controller 182 and said comparison may help inspect whether an alignment of the component 112 at the location 150 is ideal, allowable, or disputable, and/or to what extent the alignment has varied from the 'ideal placed state'. If the variation, as derived by such a comparison, is detected to have exceeded beyond a threshold, the controller 182 may instruct the component selector tool 210 to attempt repositioning of the component 112 at the locale 150' (i.e., the location 150). Such a process may be repeated until the component 112 is aligned to the locale 150' (i.e., location 150) and is brought into assembly with the structure 108 within allowable/tolerable limits. Additionally, or optionally, once the component 112 is appropriately placed at the location 150, the controller 182 may instruct the work tool 264 to secure the component 112 to the structure 108.

The assembly process 266, as described above, may be repeated until all components 112', 112", 112''', 112"" are arranged (and/or assembled) at the corresponding and appropriate locations of the structure 108. Such automated assembly of the component 112 to the structure 108 helps reduce assembling errors and lead time generally associated with the assembly of such components to structures. In particular, the assembly process 266 helps eliminate the need for manually locating the location 150. Further, the assembly process 266 mitigates alignment errors of the component with respect to the structure 108. Moreover, the assembly process 266 creates a safer environment for operators by minimizing manual intervention (although, in some cases, manual inspections of the assembly process 266 may be contemplated as additional checkpoints for monitoring and maintaining the accuracy of the assembly process 266). The assembly process 266, in brevity, reduces assembling errors and re-work, thereby increasing assembly efficiency and accuracy.

It will be apparent to those skilled in the art that various modifications and variations can be made to the system of the present disclosure without departing from the scope of the disclosure. Other embodiments will be apparent to those skilled in the art from consideration of the specification and practice of the system disclosed herein. It is intended that the specification and examples be considered as exemplary only, with a true scope of the disclosure being indicated by the following claims and their equivalent.

What is claimed is:

1. A method for assembling a component to a structure at a component assembling unit of a manufacturing environment, the method comprising:
   determining, by a controller, a location on the structure for a placement of the component onto the structure;
   activating, by the controller, a light source to project a visual indicator onto the location, wherein the visual indicator includes an attribute of the component; and
   actuating, by the controller, a robotic implement to grab the component and to locate, position and assemble the component to the structure at the location based on the visual indicator projected onto the location.

2. The method of claim 1 further comprising identifying, by the controller, one or more points on a model of the structure for determining the location on the structure, wherein the location corresponds to the one or more points on the model.

3. The method of claim 2 further comprising:
   activating, by the controller, a scanner to generate a 3-dimensional point cloud data of the structure; and
   gathering, by the controller, the 3-dimensional point cloud data to develop the model, wherein the model includes a graphical 3-dimensional object generated in 3-dimensional coordinate system space.

4. The method of claim 3, wherein the scanner includes a laser scanner.

5. The method of claim 2 wherein identifying the one or more points on the model includes comparing the model to a predefined model of the structure, the predefined model defining one or more predetermined spots that correspond to the one or more points on the model.

6. The method of claim 2, wherein determining the location on the structure corresponding to the one or more points on the model of the structure includes:
   determining, by the controller, a datum on the structure;
   identifying, by the controller, a fiducial corresponding to the datum on the model;
   detecting, by the controller, coordinates of the one or more points on the model relative to the fiducial; and
   computing, by the controller, a site on the structure that relates to the datum as the coordinates relate to the fiducial,
   wherein the site is determined as the location corresponding to the one or more points.

7. The method of claim 1, wherein actuating the robotic implement to locate, position and assemble the component at the location based on the visual indicator includes:
   instructing, by the controller, a detector to detect an attribute of the visual indicator;
   actuating, by the controller, the robotic implement to select the component from among one or more components based on the attribute; and
   upon a selection of the component by the robotic implement, moving, by the controller, the robotic implement up to the location to place the component at the location.

8. The method of claim 7, wherein the attribute corresponds to at least one of a shape, a color, or a text indicated by the visual indicator at the location.

9. The method of claim 1, wherein the light source includes a laser source to project the visual indicator by way of a laser beam onto the location.

10. A system for assembling a component to a structure at a component assembling unit of a manufacturing environment, the system comprising:
a robotic implement; and
a controller operatively coupled to the robotic implement and configured to:
determine a location on the structure for a placement of the component onto the structure;
activate a light source to project a visual indicator onto the location, wherein the visual indicator includes an attribute of the component; and
actuate the robotic implement to grab the component and to locate, position and assemble the component to the structure at the location based on the visual indicator projected onto the location.

11. The system of claim 10, wherein the controller is configured to identify one or more points on a model of the structure for determining the location on the structure, wherein the location corresponds to the one or more points on the model.

12. The system of claim 11 wherein the controller is configured to:
activate a scanner to generate a 3-dimensional point cloud data of the structure; and
gather the 3-dimensional point cloud data to develop the model, wherein the model includes a graphical 3-dimensional object generated in 3-dimensional coordinate system space.

13. The system of claim 12, wherein the scanner includes a laser scanner.

14. The system of claim 11, wherein the controller is configured to identify the one or more points on the model by comparing the model to a predefined model of the structure, the predefined model defining one or more predetermined spots that correspond to the one or more points on the model.

15. The system of claim 11, wherein the controller is configured to determine the location on the structure corresponding to the one or more points on the model of the structure by:
determining a datum on the structure,
identifying a fiducial corresponding to the datum on the model;
detecting coordinates of the one or more points on the model relative to the fiducial; and
computing a site on the structure that relates to the datum as the coordinates relate to the fiducial,
wherein the site is determined as the location corresponding to the one or more points.

16. The system of claim 10, wherein the robotic implement includes a detector to detect an attribute of the visual indicator, the controller being configured to actuate the robotic implement to locate, position and assemble the component at the location based on the visual indicator by:
instructing the detector to detect the attribute;
actuating the robotic implement to select the component from among one or more components based on the attribute; and
upon a selection of the component by the robotic implement, moving the robotic implement up to the location to place the component at the location.

17. The system of claim 16 further comprising a track adapted to be disposed around the structure, wherein moving the robotic implement to place the component at the location is facilitated along the track.

18. The system of claim 16, wherein the attribute corresponds to at least one of a shape, a color, or a text indicated by the visual indicator at the location.

19. The system of claim 10, wherein the light source includes a laser source to project the visual indicator by way of a laser beam onto the location.

20. The system of claim 10, wherein the robotic implement includes a component selector tool to selectively grab and release the component.

* * * * *